United States Patent
Mohamed

(10) Patent No.: US 10,106,167 B2
(45) Date of Patent: Oct. 23, 2018

(54) CONTROL SYSTEM AND METHOD FOR DETERMINING AN IRREGULARITY OF A ROAD SURFACE

(71) Applicant: TRW AUTOMOTIVE GMBH, Alfdorf (DE)

(72) Inventor: Manoj Peer Mohamed, Duesseldorf (DE)

(73) Assignee: TRW AUTOMOTIVE GmbH (DE)

( * ) Notice: Subject to any disclaimer, the term of this patent is extended or adjusted under 35 U.S.C. 154(b) by 0 days.

(21) Appl. No.: 15/402,320

(22) Filed: Jan. 10, 2017

(65) Prior Publication Data

US 2017/0197630 A1 Jul. 13, 2017

(30) Foreign Application Priority Data

Jan. 11, 2016 (DE) .................. 10 2016 000 209

(51) Int. Cl.
*B60W 40/06* (2012.01)
*B60W 30/14* (2006.01)
(Continued)

(52) U.S. Cl.
CPC .......... *B60W 40/06* (2013.01); *B60W 30/143* (2013.01); *G06K 9/00798* (2013.01);
(Continued)

(58) Field of Classification Search
CPC ............. G06T 7/70; G06T 2207/30256; G06T 2207/30261; G06K 9/78; G06K 9/00798; G06K 9/00805; B60W 40/06; B60W 30/143; B60W 2710/226; B60W 2520/14; B60W 2520/125; B60W 2520/10; B60W 2420/42
See application file for complete search history.

(56) References Cited

U.S. PATENT DOCUMENTS 9,381,811 B2 * 7/2016 Kondoh ................. B60K 31/18
2004/0215393 A1 * 10/2004 Matsumoto ......... B60T 8/17557
701/300

(Continued)

FOREIGN PATENT DOCUMENTS

| DE | 102005051141 | 5/2007 |
| DE | 102011007608 | 10/2012 |
| DE | 102012022367 | 5/2014 |

*Primary Examiner* — Mussa A Shaawat
(74) *Attorney, Agent, or Firm* — Tarolli, Sundheim, Covell & Tummino, LLP

(57) ABSTRACT

Control system, which is adapted for application in a vehicle and intended to recognize vehicles driving in front on the basis of environmental data which are obtained from at least one environmental sensor (110) disposed on the vehicle. The at least one environmental sensor (110) is adapted to provide an electronic controller (200) of the control system with the environmental data which reflect the area (115) in front of the vehicle. The control system is at least adapted and intended to detect another vehicle (alter) participating in traffic in front of the own vehicle (ego) with the at least one environmental sensor (110) during a predetermined time period or continuously and to recognize a position change of the other vehicle (alter). If a position change of the other vehicle (alter) is recognized, a signal (255) is output, which is suitable to warn a driver of the own vehicle (ego) of an irregularity in the road surface and/or to adjust a speed and/or a vehicle setting of the own vehicle (ego).

15 Claims, 3 Drawing Sheets

(51) Int. Cl.
   *G06K 9/00* (2006.01)
   *G06K 9/78* (2006.01)
   *G06T 7/70* (2017.01)
(52) U.S. Cl.
   CPC .............. *G06K 9/78* (2013.01); *G06T 7/70* (2017.01); *B60W 2420/42* (2013.01); *B60W 2520/10* (2013.01); *B60W 2520/125* (2013.01); *B60W 2520/14* (2013.01); *B60W 2710/223* (2013.01); *B60W 2710/226* (2013.01); *B60W 2750/306* (2013.01); *G06K 9/00805* (2013.01); *G06T 2207/30256* (2013.01); *G06T 2207/30261* (2013.01)

(56) References Cited

U.S. PATENT DOCUMENTS

| | | | |
|---|---|---|---|
| 2005/0125153 A1* | 6/2005 | Matsumoto | B60T 8/17557 701/300 |
| 2009/0097038 A1* | 4/2009 | Higgins-Luthman | B60G 17/019 356/602 |
| 2010/0020170 A1* | 1/2010 | Higgins-Luthman | B60Q 1/1423 348/135 |
| 2010/0222959 A1* | 9/2010 | Murata | B60G 17/0195 701/31.4 |
| 2010/0222960 A1* | 9/2010 | Oida | B60G 17/0195 701/31.4 |
| 2012/0224060 A1* | 9/2012 | Gurevich | B60R 1/00 348/148 |
| 2012/0313811 A1* | 12/2012 | Suzuki | G01S 7/411 342/147 |
| 2015/0336546 A1* | 11/2015 | Al-Zahrani | G08G 1/165 701/93 |
| 2016/0093210 A1* | 3/2016 | Bonhomme | G08G 1/0967 340/905 |
| 2016/0252613 A1* | 9/2016 | Suarez | G01S 7/412 342/70 |
| 2016/0318365 A1* | 11/2016 | Sivaraman | B60G 17/0165 |
| 2017/0043771 A1* | 2/2017 | Ibanez-Guzman | B60W 30/0956 |
| 2017/0137023 A1* | 5/2017 | Anderson | B60W 30/02 |

* cited by examiner

CONTROL SYSTEM AND METHOD FOR DETERMINING AN IRREGULARITY OF A ROAD SURFACE

BACKGROUND TO THE INVENTION

A control system and a method for determining an irregularity of a road surface are disclosed here. This system and method are based in particular on an environmental sensor system in a vehicle and support the driver in adjusting his mode of driving to the nature of the road surface. In partly automated vehicles and autonomously controlled vehicles, it increases the driving comfort and the safety of the occupants of the vehicle.

PRIOR ART

Current driver assistance systems (ADAS—advanced driver assistance system) offer a plurality of monitoring and hint functions in vehicles, in order to make the driving of a vehicle safer. In this regard the environment of the vehicle is monitored on the basis of environmental data obtained from one or several environmental sensors disposed on the vehicle with respect to the journey progress of the own vehicle.

Known driver assistance systems monitor, for example, whether the vehicle is located within a lane and whether the driver drifts unintentionally to one side of the lane or is on the point of leaving it. These driver assistance systems generate an "image" of the road and in particular of the lane from the environmental data obtained. Objects are recognised and tracked during the driving, such as, for example, a kerb, lane demarcation lines, direction arrows etc. . . .

In vehicles driven by persons, these systems mostly offer a hint function, to warn the driver of a critical situation or a corresponding manoeuvre. The driver assistance systems can likewise be applied even in autonomously controlled vehicles, in order to provide the autonomous controller with the corresponding environmental data.

Underlying Problem

The road surface influences both the driving safety and the driving comfort of the occupants of a vehicle. Irregularities in the road surface can influence the road grip and the contact between the road surface and the wheels of the vehicle. In particular, bumps in the road surface can set one or more of the wheels of the own vehicle vibrating in relation to the bodywork of the vehicle. The grip of the wheels on the road surface and thus the control of the vehicle are negatively influenced by this.

As the speed of the own vehicle increases, problems increase in the case of irregularities in the road surface. An uneven road surface or pothole can bring the vehicle off its track, and at high speed even lead to damage to the wheel or wheel suspension. The damping of an impact on account of the irregularity in the road surface is, depending on the speed, likewise no longer possible or only possible to a limited extent. The driving comfort of the occupants of the vehicle is also considerably impaired by this.

Proposed Solution

A control system which is adapted and intended for application in a vehicle detects vehicles driving in front on the basis of environmental data obtained from at least one environmental sensor disposed on the vehicle. To this end the environmental sensors are adapted to provide an electronic controller (ECU) of the control system with the environmental data reflecting the area in front of the vehicle. The control system is adapted and intended at least to detect another vehicle participating in the traffic in front of the own vehicle with the at least one environmental sensor during a predetermined period of time or continuously. The control system is adapted and intended at least to detect a change in the position of the other vehicle and, if a position change of the other vehicle is detected, to output a signal that is suitable to warn the driver of the own vehicle of an irregularity in the road surface and/or to adjust a speed and/or vehicle setting of the own vehicle.

In conventional environmental and assistance systems, only other vehicles as well as a lane of the own vehicle are detected. Due to the positional relationship of the own vehicle to the other vehicles and the lane, certain aids are generated for the driver of the own vehicle. Even if specific conspicuous features are detected by the environmental data of conventional systems in the road surface, such as a drain cover, road gully or road marking, for example, these data are not used further to support the driver or a driving system.

The solution presented here permits an increase in driving safety and driving comfort, in that an irregularity in the road surface in front of the own vehicle is recognised, and so a speed of the vehicle and/or a vehicle setting can be adapted to the Irregularity in the road surface either by the driver or a driving system. In the solution presented here, another vehicle participating in traffic in front of the own vehicle in particular is detected and monitored. If a position change of the other vehicle is recognised in this process, the control system can deduce an irregularity in the road surface from the position change of the other vehicle and react accordingly.

Other Adaptations and Advantageous Developments

The at least one environmental sensor can comprise a camera directed forwards in the direction of travel of the own vehicle. In this case the control system can further be adapted and intended to receive image data from the camera, and to recognise the position change of the other vehicle in the image data received. Naturally even more than one camera directed forwards can be used to generate the necessary environmental data for the solution presented here.

The vehicle driving in front can be another vehicle that is driving in the same lane as the own vehicle. Alternatively or in addition, another (further) vehicle, which is located in another lane from the own vehicle, can also be detected and its (their) position tracked.

The other vehicle advantageously moves in the same direction as the own vehicle. On account of the usual small or smaller difference in speed between the own vehicle and the other vehicle in this case, the other vehicle can be detected more accurately and its position (position change) recognised better. Alternatively or in addition, one or more other vehicles, which are driving in a direction opposite to the own vehicle, can be detected and its/their position (position change) recognised.

Furthermore, the control system can be adapted and Intended to recognise at least one feature of the other vehicle in temporally first image data, and in subsequent second image data received during the predetermined time period or continuously to detect respectively a position of the at least one feature of the other vehicle. The position change of the other vehicle can be calculated by the control system in this case with reference to at least two positions of the at least one feature of the other vehicle detected in the first and second image data.

The at least one feature of the other vehicle can be a conspicuous feature on the vehicle. The feature advantageously has a contrast to its surroundings on the vehicle. Included here in particular are a number plate, one or more lamps, a windscreen, a sticker etc., which is/are arranged on the other vehicle in such a way that it/they can be detected and recognised by the environmental sensor of the own vehicle.

The camera can be a camera of a lane assistance system of the own vehicle. The control system described here and adapted and intended for use in a vehicle can comprise, as well as or instead of the camera(s), at least one other environmental sensor, which serves to detect the environment of the own vehicle and operates with another technology, such as radar, ultrasound, lidar, etc., for example. The control system processes the environmental data obtained from the environmental sensor(s) (camera(s)) located on the vehicle in order to recognise the one or more vehicles driving in front. For example, the processing can take place by an electronic controller (ECU—Engine/Electronic Control Unit).

The control system can be further adapted and intended to detect a movement of the own vehicle by a measuring unit of the own vehicle, and to recognise the position change of the other vehicle as a position change relative to the own vehicle, taking the movement of the own vehicle into account. In this case the measuring unit can be a sensor for determining a speed (in the direction of travel) of the own vehicle, a sensor for determining a yaw rate of the own vehicle, a sensor for determining a vertical and/or horizontal acceleration of the own vehicle and/or a sensor for determining a steering movement of the own vehicle.

Alternatively or in addition, other sensors of the own vehicle can also be used. These include, for example, distance sensors, which can determine a distance to an object, such as the other vehicle, or radar sensors, which can determine a distance and a (relative) speed of objects. From the data obtained from the sensors, the control system can determine at least a driving speed of the own vehicle. Alternatively or in addition, a yaw rate, a vertical and/or horizontal acceleration, a steering movement, a driving curve etc. of the own vehicle can be determined according to the sensors used. These data serve to determine the movement and/or acceleration of the own vehicle. Since the environmental sensors of the own vehicle follow the movement/acceleration of the own vehicle, a recognised position change of the other vehicle can be related to the movement of the own vehicle. Thus movements/accelerations of the own vehicle can be factored out (compensated) from the determined position change of the other vehicle.

The control system can further be adapted and intended to recognise especially a vertical position change of the other vehicle. Alternatively or additionally, a horizontal position change of the other vehicle or also a longitudinal inclination or lateral inclination of the other vehicle can be recognised. Irregularities in the road surface, which affect only a part of the lane or the road surface, for example, can be recognised by this.

After a position change of the other vehicle alter is recognised, the control system can output a signal. This signal is suitable to warn a driver of the own vehicle ego of an irregularity in the road surface and/or to adjust a speed and/or vehicle setting of the own vehicle. For this the signal can be evaluated or processed by another component of the own vehicle ego. For example, the signal can be evaluated/processed by a component for producing an indication for the driver of the own vehicle ego and a corresponding indication output acoustically, visually and/or haptically. In the case of a visual output, a symbol (such as an exclamation mark, for example) and/or an information text are displayed to the driver of the own vehicle ego in a display in the dashboard or projected onto the front windscreen.

If it is a control system that can intervene in the driving operation for a partly automated or completely autonomous vehicle or can take this over, the signal can be processed further by a corresponding component to adjust a speed and/or vehicle setting of the own vehicle ego.

The vehicle setting can be a degree of springing of the wheel suspension. In the case of potholes, bumps or elevations in the road surface in particular, it is advantageous to adjust the degree of springing of the wheel suspension in such a way that a reduction in road grip or loss of contact between road and wheel is limited or completely avoided. Alternatively or in addition, the degree of springing of the wheel suspension can also be adapted to the driving comfort of the occupants. Degree of springing is understood here both as the degree of hardness of a spring and the shock absorber properties of the wheel suspension.

Alternatively or additionally, a vehicle setting can also be a steering movement of the wheels of the own vehicle. Evasive manoeuvres can be executed by this by corresponding steering processes, in order to circumvent an irregularity in the road surface.

The signal can also be output to other control components of the own vehicle. For example, it can be output to an ESP (Electronic Stability Program) or an ACC (Adaptive Cruise Control), so that these systems can react faster and better to the future driving situation.

Another aspect of the proposed solution relates to a control method, which in a vehicle recognises vehicles driving in front on the basis of environmental data obtained from at least one environmental sensor located on the vehicle. The method has the following steps of:

providing an electronic controller in the own vehicle (ego) by means of the at least one environmental sensor with environmental data reflecting the area in front of the vehicle.

detecting another vehicle (alter) participating in traffic in front of the own vehicle (ego) with the at least one environmental sensor during a predetermined time period or continuously, recognising a position change of the other vehicle (alter), and if a position change of the other vehicle (alter) is recognised, outputting a signal that is suitable to warn the driver of the own vehicle (ego) of an irregularity in the road surface and/or adapting a speed and/or vehicle setting of the own vehicle (ego).

BRIEF DESCRIPTION OF THE DRAWING

Other aims, features, advantages and application options result from the following description of practical examples, which should not be understood as restrictive, with reference to the related drawings. Here all described and/or illustrated features show the object disclosed here by themselves or in any combination, even independently of their grouping in the claims or their references. The dimensions and proportions of the components shown in the figures are not necessarily to scale in this case; they can deviate from what is shown here in embodiments to be implemented.

DETAILED DESCRIPTION OF THE DRAWINGS

Figure 1:
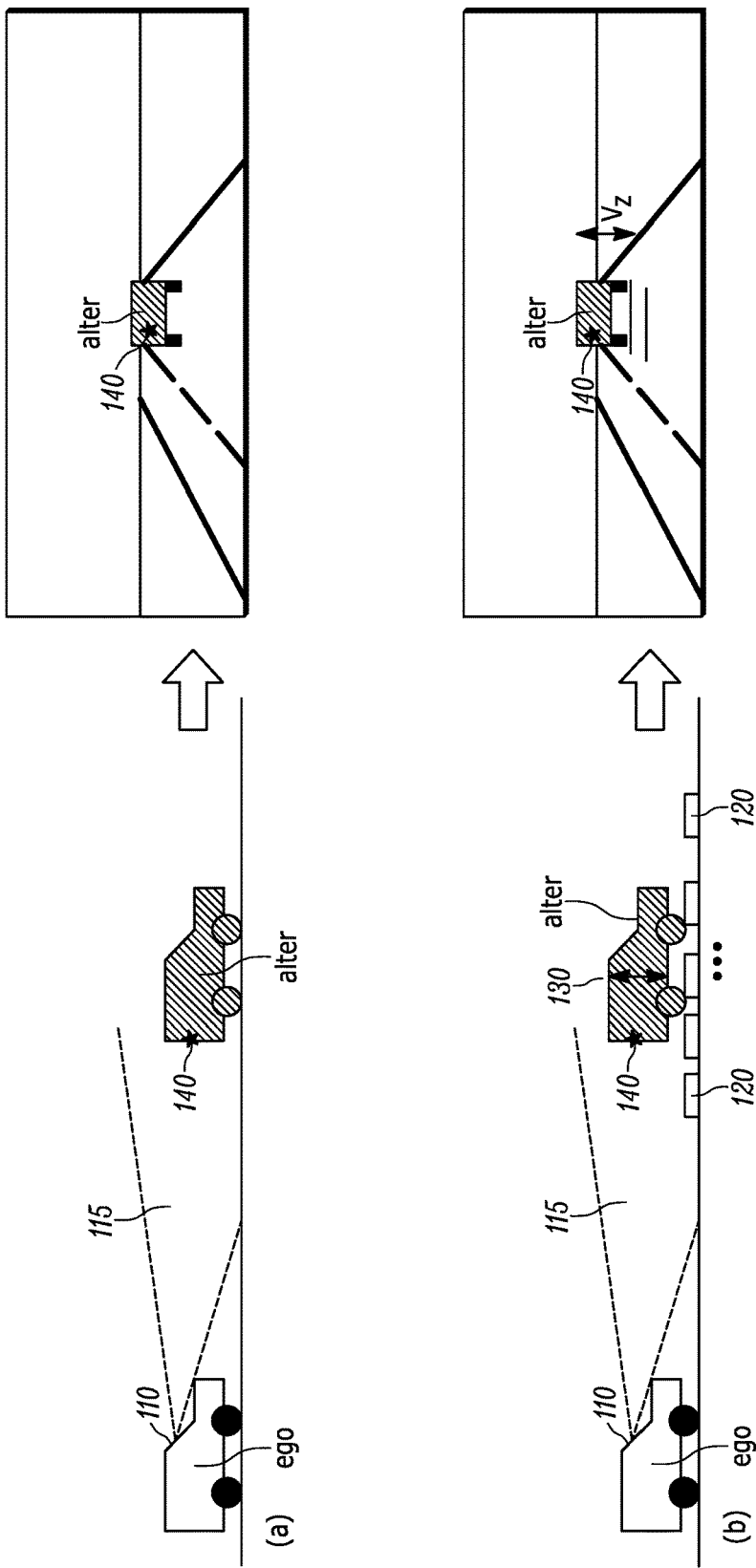
FIG. 1 shows schematically an own vehicle, which monitors another vehicle driving in front for a position change.

FIG. 1 shows schematically an own vehicle ego, which monitors another vehicle alter driving in front for a position change. For this similar driving situations are shown above one another in FIG. 1 and designated ("a") and ("b"). In the top driving situation (a), the road surface is substantially even, while in the bottom driving situation (b) irregularities 120 are present in the road surface. Road surface here means the surface of the ground on which the vehicles move. It can therefore be the asphalt, concrete etc. of a road or lane. Likewise it can also be a dirt track or dirt road, which nevertheless comprises a certain level surface, thus without irregularities.

The own vehicle ego comprises at least one environmental sensor 110, which detects an area 115 in front of the own vehicle ego. To this end the at least one environmental sensor 110 is adapted to provide an electronic controller (ECU) of the control system with environmental data reflecting the area 115 in front of the vehicle. The at least one environmental sensor 110 detects continuously one or more other vehicles alter participating in the traffic in front of the own vehicle ego, in order to determine parameters about the driving situation(s) of the other vehicle(s). These parameters include, for example, the speed, location as a function of the time, and direction of travel of the other vehicle(s).

For example, the at least one environmental sensor can be a camera 110. The control system described here and adapted and intended for use in a vehicle has, as well as or instead of the camera 110, other environmental sensors, which serve to detect the surroundings of the own vehicle ego and operate with another technology, such as radar, ultrasound, lidar etc., for example. The electronic controller ECU processes the environmental data obtained from the environmental sensor(s) (camera(s) 110) located on the vehicle in order to determine whether another vehicle alter participating in traffic is located in front of the own vehicle ego. To this end the environmental sensors 110 provide the electronic controller ECU with environmental data reflecting the area 115 in front of the vehicle. The term "camera" used in the following description can thus be exchanged as desired for "environmental sensor" or a special environmental sensor named above.

It is advantageous if a camera 110 of a lane assistance system of the own vehicle ego is used. This monitors mostly the area 115 in front of the own vehicle ego. Due to this no additional environmental sensor and thus no additional weight has to be provided on the own vehicle ego. The image data of the camera 110 of the lane assistance system are usually already transmitted to a controller (ECU), so that these can easily be evaluated for the technique of the present disclosure. The control method described here could thus also be realised together with the lane assistance system or integrated into this.

Furthermore, the control system or the electronic controller ECU can recognise a position change of the other vehicle alter. As is shown in the top part (a) of FIG. 1, the camera 110 monitors an area 115 in front of the own vehicle ego. In this area 115 another vehicle alter is located, which is detected by the camera 110 during a predetermined time period or continuously. The picture taken of the area 115 by the camera 110, in which picture the other vehicle alter is located, is shown schematically in the right-hand part of FIG. 1.

In the bottom part (b) of FIG. 1, a driving situation is now shown in which the road surface has irregularities 120. Here, too, the area 115 in front of the own vehicle ego is monitored by the own vehicle ego using the camera 110. The other vehicle alter is again located in this. For example, the driving situation in FIG. 1 (b) represents a time after the driving situation from FIG. 1 (a). In the meantime, the position of the other vehicle alter driving in front was detected or monitored by the control system.

By driving over the irregularities 120, the other vehicle alter moves in a vertical direction. This is identified in FIG. 1 as a corresponding double arrow 130 or "Vz". The irregularities 120 are accordingly vertical changes in the road surface. At least a part of the other vehicle alter is deflected by these in a vertical direction. The control system can recognise the position change of the other vehicle alter by an image comparison of the data of the camera 110.

In this case the control system does not have to detect the position of the complete other vehicle alter. On the contrary, it is sufficient to recognise one or more features 140 at/on the other vehicle alter. The control system can be adapted and intended to recognise the at least one feature 140 of the other vehicle alter in temporally first image data, and in subsequent second image data received during a predetermined time period or continuously, to calculate a position respectively of the at least one feature 140 of the other vehicle after. A position change of the other vehicle alter can then be calculated with reference to the two positions detected in the first and second image data of the at least one feature 140 of the other vehicle alter. Naturally positions of the feature 140 can also be detected and tracked from more than two following image data. In other words, the control system tracks a once recognised feature 140 at/on the other vehicle alter during the predetermined time period or continuously in the image data received from the camera 110. This can be carried out, for example, by a blockwise comparison of the first and temporally following second image data in an area around the (already) recognised feature.

The control system disclosed here can further be adapted and intended to recognise, as well as or instead of a vertical position change of the other vehicle alter, a horizontal position change or a combination of vertical and horizontal position change. A horizontal position change can be caused by the other vehicle alter driving in front, for example, if this avoids an irregularity in the road surface. In particular, if a driver of the other vehicle alter driving in front avoids a pothole, a horizontal position change (mostly followed by an opposed horizontal position change back to the original track) can be identified by the control system.

If the irregularities 120 are located only in one area of the lane, then only a part of the vehicle can move in a vertical direction. Such a partial position change of the other vehicle alter can be recognised easily in particular by tracking/monitoring one or more features 140 at/on the other vehicle alter.

After a position change of the other vehicle alter is recognised, the control system can output a signal. This signal is advantageously suitable to warn a driver of the own vehicle ego of an irregularity in the road surface and/or to adjust a speed and/or vehicle setting of the own vehicle. For this the signal can be evaluated or processed by another component of the own vehicle ego. For example, the signal can be evaluated/processed by a component to produce an indication for the driver of the own vehicle ego and a corresponding indication output acoustically, visually and/or haptically. In the case of a visual output, a symbol (such as an exclamation mark, for example) and/or an Information text is displayed for the driver of the own vehicle ego in a display in the dashboard or projected onto the windscreen.

If it is a control system that intervenes in the driving operation, or an autonomously controlled vehicle, the signal can be processed further by a corresponding component to adjust a speed and/or vehicle setting of the own vehicle ego. The vehicle setting can be a degree of springing of the wheel suspension. In the case of potholes, bumps or elevations in the road surface in particular, it is advantageous to adjust the degree of springing of the wheel suspension in such a way that a reduction in road grip or a loss of contact between wheel and road is avoided. Alternatively or additionally, the degree of springing of the wheel suspension can also be adapted to the driving comfort of the occupants. Degree of springing is understood here both as the degree of hardness of a spring and the shock absorber properties of the wheel suspension.

Alternatively or in addition, a steering movement can also represent a vehicle setting that can be influenced by the signal. In partly automated or autonomously controlled vehicles in particular, evasive manoeuvres can be carried out around the irregularity in the road surface. In this case a measure of a horizontal position change of the other vehicle alter can be used to determine the extent of the evasive manoeuvre (horizontal offset) of the own vehicle ego.

Figure 2:
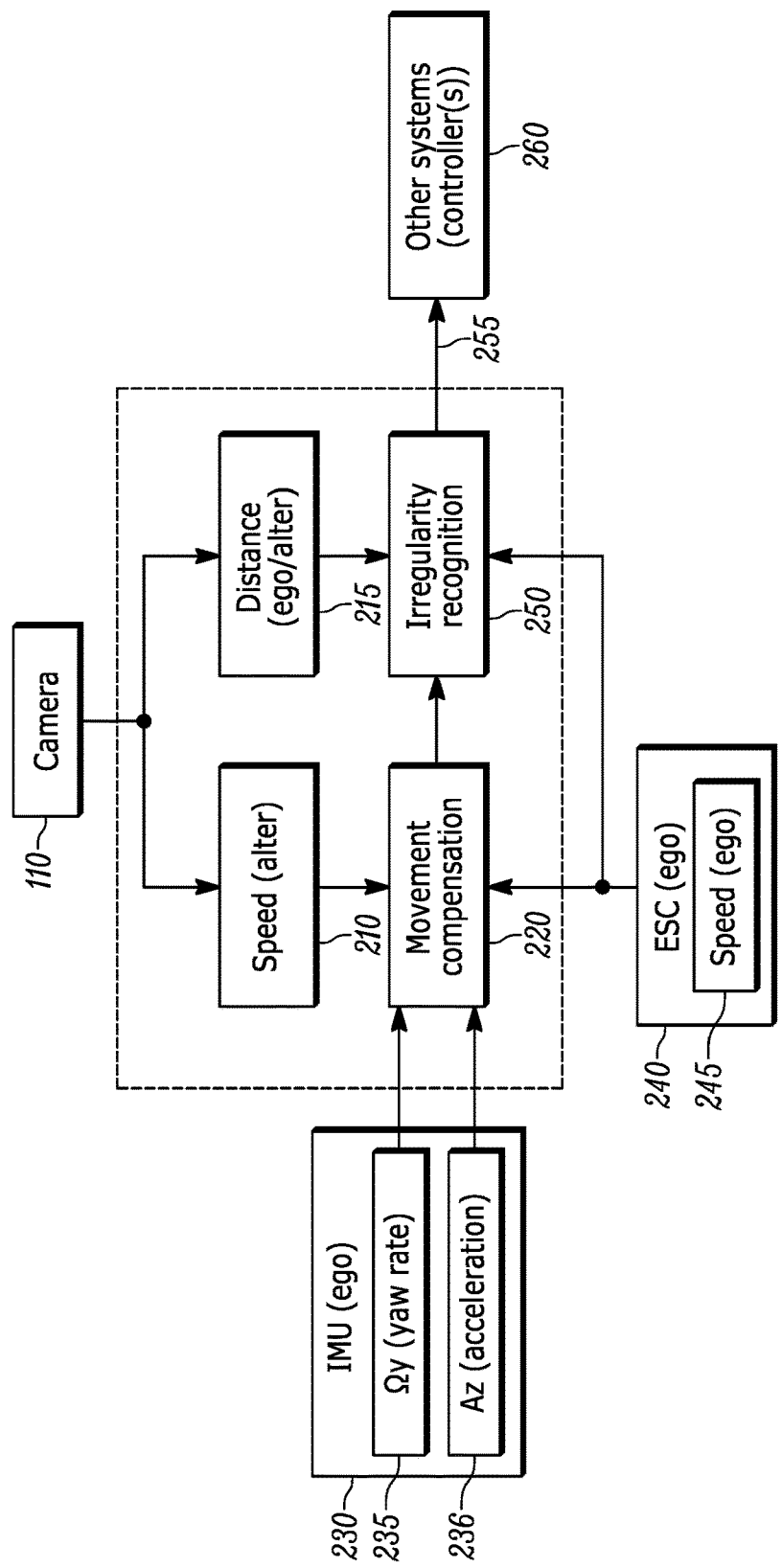
FIG. 2 shows schematically a control system, which is suitable for use in a vehicle and is adapted and intended to recognise vehicles driving in front on the basis of environmental data.
Figure 3:
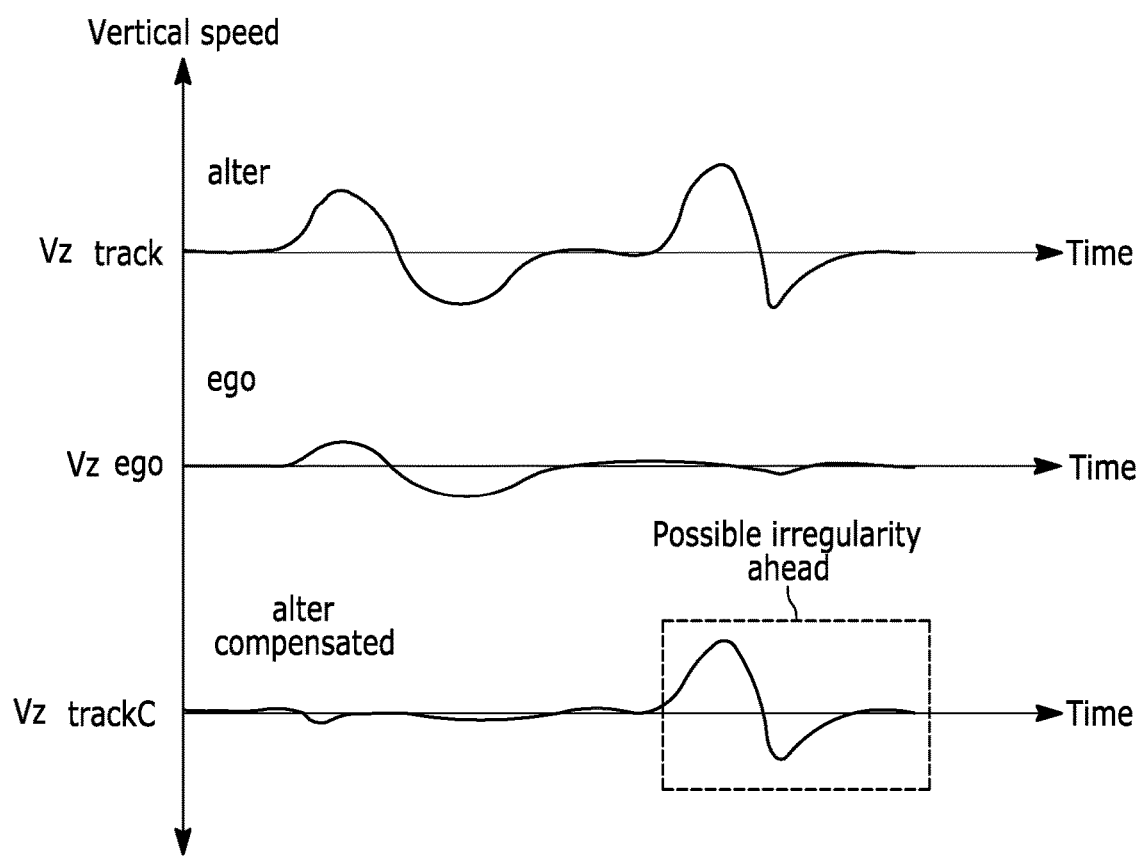
FIG. 3 shows by way of example a position change of a vehicle driving in front over the time, a movement determined for the own vehicle and a relative position change of the other vehicle that is compensated from this information.

Another aspect of the solution presented here is now described with reference to FIGS. 2 and 3. FIG. 2 shows schematically a control system, which is suitable for use in a vehicle and is adapted and intended to recognise a vehicle driving in front on the basis of environmental data. FIG. 3 shows by way of example a position change of a vehicle driving in front over the time, a movement determined for the own vehicle and a relative position change of the other vehicle compensated from this information.

The control system 200 comprises one or more interfaces with the camera 110 already described above. The image data output by this or other sensor data are processed initially by other components. A component 210 for determining a speed of the other vehicle alter as well as a component 215 for determining a distance of the other vehicle alter from the own vehicle ego are shown as an example in FIG. 2. These components 210, 215 can naturally also be integrated in the camera 110 or another environmental sensor.

The control system further comprises an interface with a measuring unit 230 ("Integral Measuring Unit—IMU") of the own vehicle ego. The measuring unit 230 can comprise a sensor or sensor unit 235 for recognising a yaw rate of the own vehicle ego. A movement about a vertical axis of the own vehicle ego can thus be recognised and detected. The movement can comprise an acceleration and/or speed component. The measuring unit 230 further comprises an acceleration sensor 236. This measures an acceleration of the own vehicle ego in a vertical and/or horizontal direction. By comparing the data obtained by the yaw rate sensor 235 and acceleration sensor 236, the measuring unit 230 can calculate a movement of the own vehicle ego with regard to a defined coordinate system and during a predetermined time period or continuously.

For this a speed of the own vehicle ego in the travel direction can also be used, which is determined by a corresponding travel direction speed component 245. This travel direction speed component 245 can be part of a vehicle dynamics control 240 ("Electronic Stability Control—ESC") of the own vehicle ego. This ESC 240 is also coupled to the control system 200 via an interface.

The control system 200 can comprise a movement compensation component 220 for compensating the movement of the own vehicle ego. The movement compensation component 220 receives data of the speed component 210 for monitoring the other vehicle alter as well as of the measuring unit 230 and calculates from these a movement/speed of the other vehicle alter compensated by the movement/speed of the own vehicle ego. This is now described with regard to the vertical speed/acceleration of the own vehicle ego and of the other vehicle alter with reference to FIG. 3. This can naturally also be carried out for a speed/acceleration in a horizontal direction.

In a first, top graph of FIG. 3, a vertical speed of the other vehicle alter driving in front is displayed over the time. The data for this first graph originate, for example, from the speed component 210 from FIG. 2. In a second, middle graph of FIG. 3, a vertical speed of the own vehicle ego is displayed over the time.

In a third, bottom graph of FIG. 3, a relative vertical speed of the other vehicle alter is shown, which is a position change of the other vehicle alter relative to the own vehicle ego, taking the movement of the own vehicle ego into account. In other words, the vertical speed of the other vehicle alter is calculated compensated by the vertical speed of the own vehicle ego at the time of the picture by the camera 110. The vertical speed of the own vehicle ego is thus factored out from that of the other vehicle alter.

As can be gathered from all three graphs in FIG. 3, the two vertical movements of the other vehicle alter that follow one another in time (see first, top graph) are attributable to a vertical movement of the own vehicle ego and an actual vertical movement of the other vehicle alter (see second, middle graph). In the representation of the compensated vertical speed of the other vehicle alter (see third, bottom graph), it is to be recognised that the first vertical position change of the other vehicle alter is compensated to virtually zero, while the second position change exists even after the compensation.

Again with regard to FIG. 2, the result of the calculation of the movement compensation component 220 is output to a component 250 for recognising irregularities. This component 250 is adapted and intended to recognise an irregularity in the road surface from the compensated vertical speed of the other vehicle alter. To this end the component 250 can compare the values of the vertical speed of the other vehicle alter, for example, (see third, bottom graph in FIG. 3) with a threshold value. If the vertical speed value exceeds this threshold value, the component 250 can output a signal 255 that characterises an Irregularity in the road surface. The threshold value can be set in this case as a function of a speed of the own vehicle ego and/or as a function of a speed of the other vehicle alter. Alternatively, the threshold value can also be fixedly programmed.

The signal 255 of the component 250 is finally output to one or more other systems 260. The signal 255 is suitable to warn a driver of the own vehicle ego of an Irregularity in the road surface and/or to adjust a speed and/or vehicle setting of the own vehicle ego. In other words, the signal 255 of the component 250 is adapted in such a way that it can be evaluated or processed by the one or more other systems 260. These other systems 260 produce a warning to the driver of an irregularity in the road surface corresponding to the signal 255.

Alternatively or in addition (by the same system 260 or another system 260), a speed and/or a vehicle setting of the own vehicle ego can be adjusted. As an example an ESC system or ACC system ("Adaptive Cruise Control" system) of the own vehicle ego is cited here, which system reduces the speed of the own vehicle ego in order to react accordingly to the recognised irregularities in the road surface. In another example, the suspension property of the own vehicle ego is adjusted by a vehicle dynamics control system or stability control system to the recognised irregularities in the road surface. To this end a degree of springing (springing hardness, shock absorber property etc.) can be set in such a way that the safety of the vehicle and/or the comfort of the occupants of the own vehicle ego is increased.

The calculations, data and signals described with reference to FIGS. 2 and 3 can naturally also be executed for a horizontal position change of the own vehicle ego and/or of the other vehicle alter. In this case a vehicle setting can also be a steering movement of the wheels of the own vehicle ego. A corresponding system 260 can thus circumvent (avoid) an irregularity in the road surface by targeted steering manoeuvres.

The disclosure described here is not restricted to an irregularity in the road surface. It can also be applied to objects that are located on a road. These objects can thus be avoided or at least the speed can be adjusted to avoid damage to the vehicle.

The variants described above and their construction and operating aspects serve only for a better understanding of the structure, mode of operation and attributes; they do not restrict the disclosure to the practical examples, for instance. The figures are partly schematic, wherein substantial attributes and effects are shown in some cases considerably enlarged, in order to clarify the functions, active principles, technical adaptations and features. Each mode of operation, each principle, each technical adaptation and each feature here, which is/are disclosed in the figures or in the text, can be combined freely and in any way with all claims, each feature in the text and in the other figures, other modes of operation, principles, technical adaptations and features that are contained in this disclosure or result from it, so that all conceivable combinations are to be associated with the variants described. Even combinations between all individual implementations in the text, meaning in each section of the description, in the claims and also combinations between different variants in the text, in the claims and in the figures are also comprised. Even the claims do not limit the disclosure and thus the combination possibilities of all features shown with one another. All disclosed features are disclosed here explicitly also individually and in combination with all other features.

The invention claimed is:

1. A control system, which is adapted for application in an own vehicle and intended to detect vehicles driving in front on the basis of environmental data which are obtained from at least one environmental sensor (110) disposed on the own vehicle, wherein the at least one environmental sensor (110) is adapted to provide an electronic controller (200) of the control system with the environmental data (210, 215) which reflect the area (115) in front of the own vehicle, and wherein the control system is at least adapted and intended to detect another vehicle (alter) participating in traffic in front of the own vehicle (ego) by means of the at least one environmental sensor (110) during a predetermined time period or continuously, to calculate a vertical position change of the other vehicle (alter), and if a vertical position change of the other vehicle (alter) is recognised, to output a signal (255), which is suitable to warn a driver of the own vehicle (ego) of a vertical irregularity in the road surface, and/or to adjust a speed and/or vehicle setting of the own vehicle (ego) in response to the vertical irregularity in the road surface.

2. The control system according to claim 1, wherein the at least one environmental sensor comprises a camera (110) directed forwards in the travel direction of the own vehicle (ego), and the control system is further adapted and intended to receive the environmental data from the camera (110) comprising image data, and to recognise the vertical position change of the other vehicle (alter) in the image data received.

3. The control system according to claim 2, which is further adapted and intended to recognise at least one feature (140) of the other vehicle (alter) in temporally first image data, to detect a vertical position respectively of the at least one feature (140) of the other vehicle (alter) in following second image data received during the predetermined time period or continuously, and to calculate the vertical position change of the other vehicle (alter) with reference to at least two of the vertical positions detected in the first and second image data of the at least one feature (140) of the other vehicle (alter).

4. The control system according to claim 2, wherein the camera (110) is a camera of a lane assistance system of the own vehicle (ego).

5. The control system according to claim 1, which is further adapted and intended to detect a movement of the own vehicle (ego) by a measuring unit (230), and to recognise the vertical position change of the other vehicle (alter) as a vertical position change relative to the own vehicle (ego) taking the movement of the own vehicle (ego) into account.

6. The control system according to claim 5, wherein the measuring unit (230) comprises a sensor (235) to determine a yaw rate of the own vehicle (ego), a sensor (236) to determine a vertical and/or horizontal acceleration of the own vehicle (ego), a sensor (245) to determine a speed (in the travel direction) of the own vehicle (ego) and/or a sensor to determine a steering movement of the own vehicle (ego).

7. The control system according to claim 1, wherein the vehicle setting is a degree of springing of the wheel suspension.

8. A control method, which in an own vehicle recognises vehicles driving in front based on environmental data obtained from at least one environmental sensor (110) disposed on the own vehicle, with the steps of:

providing an electronic controller (200) in the own vehicle (ego) by means of the at least one environmental sensor (110) with environmental data reflecting the area (115) in front of the own vehicle, detecting another vehicle (alter) participating in traffic in front of the own vehicle (ego) with the at least one environmental sensor (110) during a predetermined time period or continuously, calculating a vertical position change of the other vehicle (alter), and if a vertical position change of the other vehicle (alter) is recognised, outputting a signal (255), which is suitable to warn a driver of the own vehicle (ego) of a vertical irregularity in the road surface, and/or adjusting a speed and/or a vehicle setting of the own vehicle (ego) in response to the vertical irregularity in the road surface.

9. Control method according to claim 8, wherein the at least one environmental sensor comprises a camera (110) directed forwards in the travel direction of the own vehicle (ego), with the steps of:
receiving the environmental data from the camera (110) comprising image data, and
recognizing a vertical position change of the other vehicle (alter) in the image data received.

10. Control method according to claim 9, with the steps of:
recognising at least one feature (140) of the other vehicle (alter) in temporally first image data,
detecting a vertical position respectively of the at least one feature (140) of the other vehicle (alter) in following second image data received during the predetermined time period or continuously, and
calculating the vertical position change of the other vehicle (alter) with reference to at least two positions of the at least one feature (140) of the other vehicle (alter) detected in the first and second image data.

11. Control method according to claim 8, with the steps of:
detecting a movement of the own vehicle (ego) by a measuring unit (230), and
recognizing the vertical position change of the other vehicle (alter) as a vertical position change relative to the own vehicle (ego) taking the movement of the own vehicle (ego) into account.

12. Control method according to claim 11, wherein the detection of the movement of the own vehicle (ego) comprises a detection of a yaw rate of the own vehicle (ego), a vertical and/or horizontal acceleration of the own vehicle (ego), a speed (in the travel direction) of the own vehicle (ego) and/or a steering movement of the own vehicle (ego).

13. A control method for detecting other vehicles driving in front of an own vehicle on a road surface, comprising:
capturing environmental data at first and second times each reflecting an area in front of the own vehicle and including a vertical position of the other vehicle; and
calculating a vertical position change of the other vehicle based on comparing captured environmental data from the first and second times; and
warning a driver of the own vehicle of a vertical irregularity in the road surface in response to the calculated vertical position change.

14. Control method according to claim 13 further comprising:
recognizing at least one feature of the other vehicle in the captured environmental data from the first and second times;
detecting a vertical position of the at least one feature of the other vehicle at each of the first and second times; and
calculating the vertical position change of the other vehicle based on the detected vertical positions at the first and second times.

15. Control method according to claim 13 further comprising:
detecting a movement of the own vehicle by a measuring unit; and
recognizing the vertical position change of the other vehicle as a vertical position change relative to the own vehicle taking the movement of the own vehicle into account.

* * * * *